(12) United States Patent
Meyers et al.

(10) Patent No.: US 7,157,803 B2
(45) Date of Patent: Jan. 2, 2007

(54) POWER SYSTEM INCLUDING LITHIUM-METAL-POLYMER BATTERIES

(75) Inventors: Jerry D. Meyers, Olathe, KS (US); Larry L. Johnson, Overland Park, KS (US); Julie A. Willets, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 98 days.

(21) Appl. No.: 11/089,667

(22) Filed: Mar. 25, 2005

(65) Prior Publication Data

US 2006/0076831 A1    Apr. 13, 2006

Related U.S. Application Data

(63) Continuation-in-part of application No. 10/298,074, filed on Nov. 15, 2002, now Pat. No. 6,960,838.

(51) Int. Cl.
*H02P 9/04* (2006.01)
*H01M 8/00* (2006.01)

(52) U.S. Cl. .................. 290/1 A; 290/1 R; 307/64

(58) Field of Classification Search ............... 290/1 R, 290/1 A, 4 R; 307/64; 320/101, 102
See application file for complete search history.

(56) References Cited

U.S. PATENT DOCUMENTS

| | | | |
|---|---|---|---|
| 4,119,861 A | 10/1978 | Gocho | |
| 4,282,634 A | 8/1981 | Yannone et al. | |
| 4,598,542 A | 7/1986 | Reynolds | |
| 4,636,173 A | 1/1987 | Mossman | |
| 5,619,077 A * | 4/1997 | Green et al. ................... | 307/64 |
| 5,737,202 A | 4/1998 | Shimamori | |
| 5,767,637 A | 6/1998 | Lansberry | |
| 5,783,932 A * | 7/1998 | Namba et al. ................. | 322/16 |
| 6,011,324 A | 1/2000 | Kohlstruck et al. | |
| 6,184,593 B1 | 2/2001 | Jungreis | |
| 6,380,637 B1 | 4/2002 | Hsu et al. | |
| 6,452,289 B1 | 9/2002 | Lansberry et al. | |
| 6,498,462 B1 | 12/2002 | Ballantine et al. | |
| 6,522,955 B1 | 2/2003 | Colborn | |
| 6,649,289 B1 | 11/2003 | Hsu et al. | |
| 6,670,721 B1 * | 12/2003 | Lof et al. ...................... | 290/44 |
| 6,703,722 B1 | 3/2004 | Christensen | |
| 6,800,963 B1 * | 10/2004 | Miyauchi et al. ............. | 307/86 |
| 6,902,837 B1 * | 6/2005 | McCluskey et al. ........... | 429/9 |
| 6,914,349 B1 * | 7/2005 | Rajagopalan ................ | 307/65 |
| 6,960,838 B1 * | 11/2005 | Johnson ...................... | 290/1 A |
| 7,000,395 B1 * | 2/2006 | Wai et al. ..................... | 60/698 |
| 7,081,687 B1 * | 7/2006 | Johnson ...................... | 290/1 A |
| 2001/0009338 A1 | 7/2001 | Reutere | |
| 2005/0200205 A1* | 9/2005 | Winn et al. ................... | 307/64 |

FOREIGN PATENT DOCUMENTS

EP    0 595 191 A    5/1994
WO   WO 99/32762    7/1999

OTHER PUBLICATIONS

"A High-Availability Backup Source of Energy", J. C. Chigolet et al. dated Sep. 27, 1993.

(Continued)

*Primary Examiner*—Nicholas Ponomarenko

(57) ABSTRACT

The present invention is an energy generating system which uses Lithium Metal Polymer (LMP) batteries in conjunction with a microturbine, a fuel cell, and commercial electrical power. The LMPs provide uninterruptible power when one or more of the other power systems fail.

17 Claims, 2 Drawing Sheets

OTHER PUBLICATIONS

Yutaka, Kuwata, "Multifuel Fuel-Cell Energy System for Telecommunications Cogeneration System," Ieice Trans. Commun., vol. E1 B., No. 11, Nov. 1998.

"Advances promise high cycle life, commercial viability for electric vehicles," Dept. of Energy, U.S.A., Apr. 2001.

* cited by examiner

POWER SYSTEM INCLUDING LITHIUM-METAL-POLYMER BATTERIES

CROSS-REFERENCE TO RELATED APPLICATIONS

This application is a continuation-in-part of and claims priority pursuant to 35 U.S.C. Section 120 from U.S. application Ser. No. 10/298,074 filed Nov. 15, 2002.

STATEMENT REGARDING FEDERALLY SPONSORED RESEARCH OR DEVELOPMENT

None.

FIELD OF THE INVENTION

In general, this invention is a power system for a facility. More specifically, this invention relates to the field of providing backup DC power systems. Additionally, the invention relates to using lithium-based energy-storage devices to cover temporary or longer power losses.

BACKGROUND OF THE INVENTION

Traditionally, telecommunications facilities have relied on a commercial power utility as their primary source for electrical power. The system used to do this includes a transformer and switchgear. Additionally, many facility's power systems include backup power sources to deliver power in the event the utility is unable temporarily to deliver power. This might happen in the case of a black-out or other disturbance in the commercial power grid. Many facilities employ a diesel generator and an array of batteries as their backup power sources. Operationally, if power from the commercial utility is lost, the diesel generator is activated to supply power to the facility. It takes time for the diesel generator to come on line, though. Because of this, the battery array provides power during the time it takes to switch from the utility source to the diesel generated source. If the generator also fails (e.g., if the generator breaks down or runs out of fuel), then the battery array is able to provide power for an additional (but limited) period of time.

The traditional devices used for these purposes are valve-regulated lead-acid (VRLA) batteries. These batteries have limitations. First, VRLA batteries produce harmful and corrosive gases. Thus, they require adequate ventilation. Ventilation is required by environmental protection agency (EPA) standards.

Second, these batteries take up too much space. So much so that users normally have to dedicate large areas in the plant, and perhaps even dedicate multiple rooms, just to house them.

Another problem with the conventional VRLA batteries is the burdensome maintenance required. Yet another problem with VRLA batteries is that they are not suitable for extreme cold or hot environments. To prolong the life expectancy of these batteries, a provider has to maintain them in a climate-controlled building or enclosure. This results in added heating and cooling costs.

The cost of local electrical utility service has risen dramatically in recent years so that the cost of local electrical utility power is now a large component of a facility's overall power expenses. Moreover, the increased number of digital components has caused the facility's power demands to increase. In addition, another factor that increases a facility's power expenses, the increased demand requires more and more batteries to provide an adequate amount of backup power for a reasonable period of time. Clearly, the component cost of the system increases when more batteries are required. Also, the greater number of batteries required has significantly increased the space required to house the system, which increases the spatial cost of the system.

To overcome the disadvantages of the conventional systems, the present invention encompasses a power system that provides reliable electrical power that is not primarily dependent on a commercial electrical utility and that does not employ an array of traditional VRLA batteries for bridging and backup purposes. The power system of the present system is more versatile, more ecologically friendly, is able to endure extreme temperatures, and its batteries require less space than the conventional battery systems do.

SUMMARY OF THE INVENTION

The present invention encompasses a power system for a telecommunications facility. The system includes a microturbine that receives natural gas from a commercial gas utility company or from one or more standby natural gas tanks. The microturbine is used as the primary power source for the facility. In the event of natural gas supply problems, or microturbine failure, the system draws power from the commercial AC power grid. In the event of failure of the AC power grid, a hydrogen-powered fuel cell delivers backup power. In the event the fuel-cell fails, lithium-metal-polymer (LMP) batteries are used for backup power. This array of LMPs is also used for bridging purposes.

BRIEF DESCRIPTION OF THE DRAWINGS

The present invention is described in detail below with reference to the attached drawing Figures, wherein.

DETAILED DESCRIPTION OF THE INVENTION

The present invention, in one embodiment, works along with a power system for a telecommunications facility.

Figure 1:
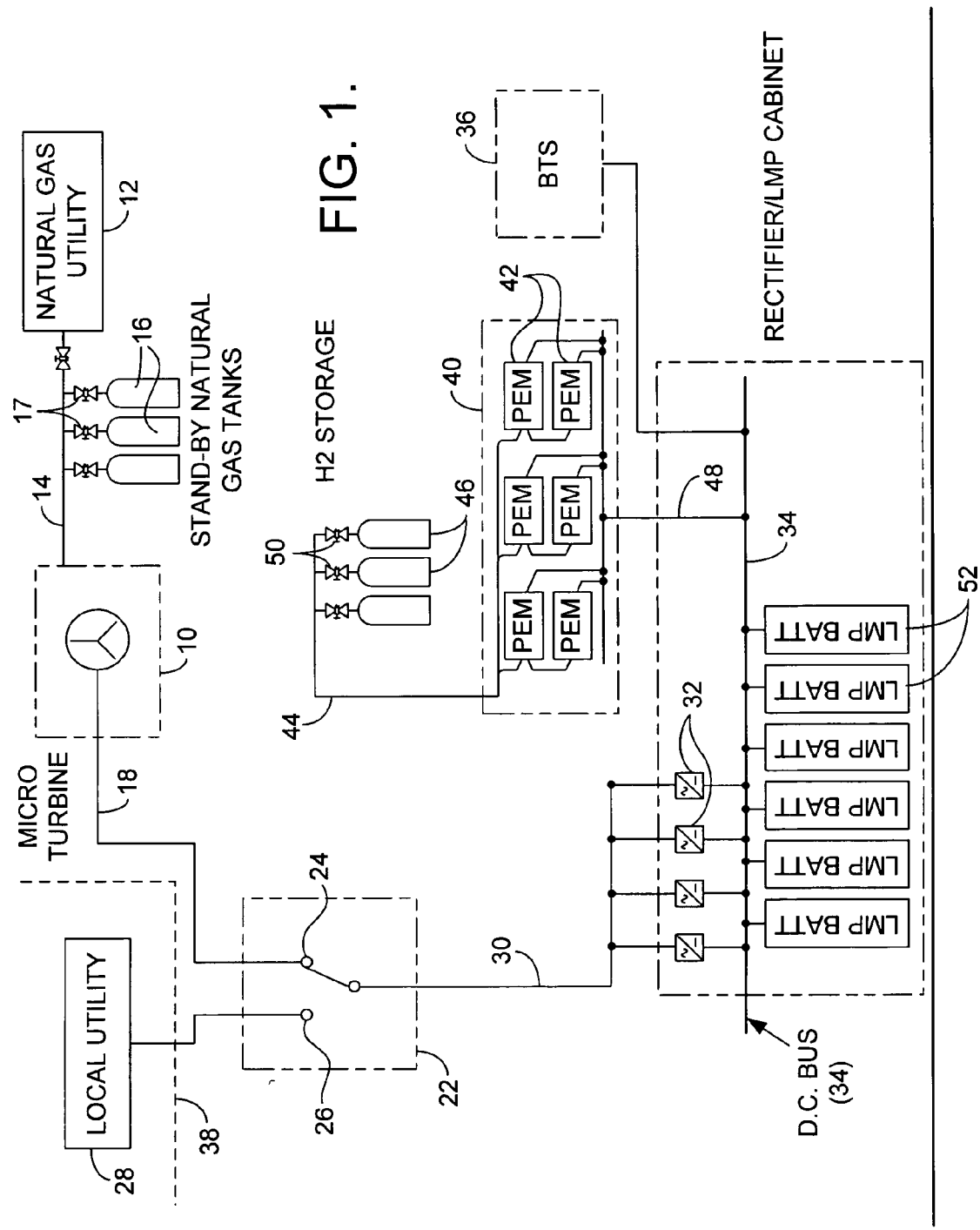
FIG. 1 is a schematic diagram showing one embodiment of the system of the present invention.
Figure 2:
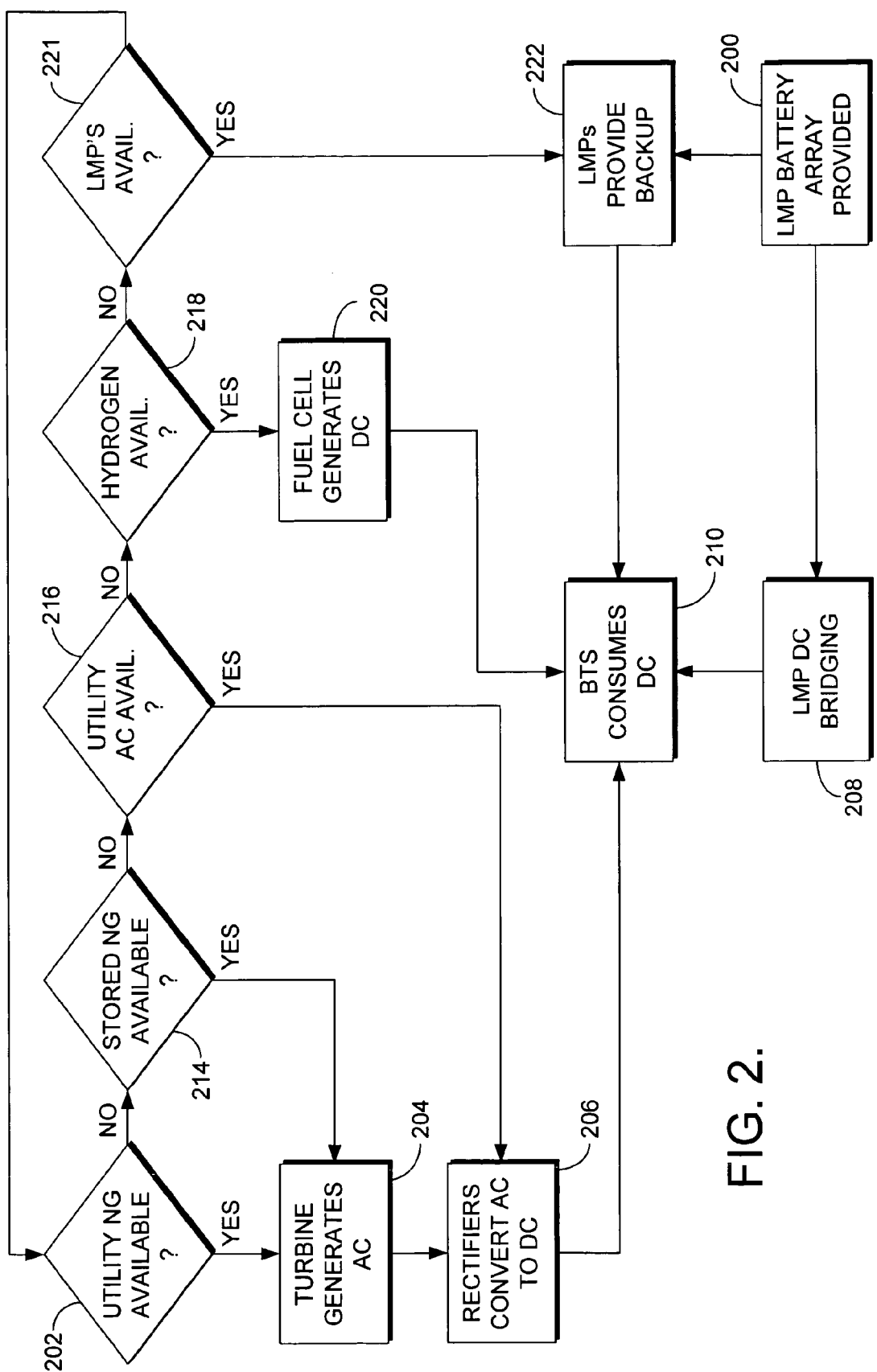
FIG. 2 is a flow diagram showing the backup-power-management system of the present invention.

The present invention is best understood in connection with the schematic diagram of FIG. 1 and the flow diagram of FIG. 2. Referring first to FIG. 1, the schematic shows one embodiment for a novel power system. The system includes a turbine generator 10. In the preferred embodiment, the turbine is driven by the combustion of natural gas. The rotational energy created by combustion is used to drive a generator. This generator utilizes the rotation of the engine to produce electrical power.

In the preferred embodiment, turbine generator 10 is a microturbine generator. One microturbine generator proven suitable for incorporation into the present invention is the Capstone 60 MicroTurbine™ system produced by the Capstone Turbine Corporation of Chatsworth, Calif. These kinds of microturbines operate in substantially the same way as do other turbines, but are smaller. They are designed to use natural gas, propane, or some other fuel source to produce electrical power. Though all of these fuels could be used, natural gas is the fuel type in the preferred embodiment. Other fuels could be used instead, however, and still fall within the scope of the present invention.

Unlike other kinds of internal combustion engines, e.g., diesel generators, microturbines emit fewer harmful gases. Further, because microturbines like turbine 10 are compact, they are ideal for situations in which space is limited.

The natural gas used to power turbine 10 is obtained primarily from a commercial utility 12. To do so, natural gas is received in a line 14 which is used to introduce natural gas into turbine 10. It is necessary for natural gas from commercial pipelines to be pressurized. Pressurization is necessary because pipelines normally run at low pressures (relatively speaking), whereas microturbines require higher pressures. To accomplish this objective, the natural gas received from utility 12 is introduced into an expansion tank (not shown) to build up pressures before being introduced into turbine 10 so that it may be properly combusted.

Utility 12 is not the only possible fuel source for turbine 10. In case there is a temporary shortage or complete failure of the line-supplied natural gas source, the system provides a stored source of natural gas. It is stored in a plurality of natural gas storage tanks 16. Tanks 16 will supply natural gas to turbine 10 in case natural gas is not available from commercial utility 12.

Regardless of how natural gas is supplied, its combustion in turbine 10 will produce a primary source of energy for the facility—initially in the form of an AC output 18 of electrical power. The AC output 18 is protected by a circuit breaker which is included with turbine 10. This protects the system from power surges and other like maladies.

AC output 18 is coupled to one side of a switch 22. The switch in the figure is shown in a first position 24 in which it is connected to the turbine output 18 of turbine 10. The switch also has a second position 26 which will connect it to the utility output 28.

Regardless of whether switch 22 is in first position 24 (as is reflected in the figure) or in second position 26, the AC is received into a switch bus 30. Bus 30 couples the switch output to a plurality of conversion devices 32. In the preferred embodiment, conversion devices 32 are rectifiers. As is known, a rectifier is capable of receiving an AC input and converting that input to produce a DC output. Thus, rectifiers 32 convert the microturbine or utility produced AC power to DC power. The output of each rectifier is coupled into DC bus 34. Bus 34 is connected into the power distribution unit (not shown) for a base transceiver station (BTS) 36. Power distribution units are comprised of the electrical equipment necessary for making connections into the telecommunication-cell-site equipment. This equipment may be housed in cabinets.

Again, in its primary mode of operation, the BTS 36 is powered by turbine 10 using natural gas from utility 12. When this is so, switch 22 will be in first position 24 as shown in the figures. In the case that natural-gas-utility-source 12 fails, valves 17 on natural-gas-storage tanks 16 will open up, and the turbine will be begin consuming the stored gas.

In the event both natural gas sources 12 and 16 fail, switch 22 moves from position 24 to position 26 (contrary to the position shown in the figure). This causes AC to be imported from utility 28. When this AC-importation begins, utility-supplied power is received into bus 30. So long as switch 22 remains in position 26, the system operates on the externally-received AC from utility 28. This will continue until natural gas is somehow restored and turbine 10 returned to service.

In the event the AC power grid fails, and natural gas is still unavailable, there is another option. The system also includes a fuel cell 40. Fuel cells are electrochemical-energy-conversion devices that utilize hydrogen and oxygen. A catalyst in the proton exchange membranes cause the electron from hydrogen to be removed temporarily. This electron passes through an external circuit to provide power to the BTS 36. The proton passes through the proton exchange membrane where the electron is recombined with the hydrogen proton and oxygen to produce water. This creates energy. The reaction is entirely non-combustive and generates DC electrical power. Because the only by-products of this reaction are heat, water, and electricity, a fuel cell is friendly to the environment and may be used in other locations where it is not possible to use engines which work on combustion. In addition, a fuel cell is capable of providing electrical power for as long as hydrogen fuel is supplied to the unit. It does not discharge like a battery.

In the preferred embodiment disclosed in FIG. 1, fuel cell 40 includes a plurality of proton-exchange-membranes (PEMs) 42. Hydrogen fuel is delivered to the plurality of PEMs 42 by way of a hydrogen tubing system 44. Hydrogen tubing system 44 is shown in the FIG. 1 as being supplied by a plurality of pressurized hydrogen tanks 46. Though the fuel cell used in the preferred embodiment has been shown and described herein as using PEMs, other fuel-cell technologies exist which might be used instead and still fall within the scope of the present invention. One example of a PEM-type fuel cell which is suitable for use with the present invention is the modular, cartridge-based, proton exchange membrane I-1000 power module manufactured by Reli-On, Inc. of Spokane, Wash.

Though the hydrogen fuel is shown in FIG. 1 as being supplied through tubing system 44 to the PEMs 42 from storage tanks 46, it is important to realize that it might alternatively be provided from vaporizing liquid hydrogen, using a hydrogen generator system (e.g., a system which acts on water to separate the hydrogen) or delivered from some other source.

Regardless of the source, gaseous hydrogen will be delivered when necessary via hydrogen supply line 44. The rate of hydrogen flow into line 44 may be controlled using valves 50 at each of the tanks 46. Once the hydrogen reaches the fuel cell PEMs, a DC power output 48 is produced. Output 48 feeds into DC bus 34 which makes the fuel-cell-produced power available to BTS 36.

The FIG. 1 embodiment also includes a plurality of energy storage devices 52. These devices are electrically connected into bus 34 as an additional source of DC for bridging and additional backup purposes.

In the preferred embodiment, each of the plurality of energy-storage devices 52 is a Lithium-Metal-Polymer battery ("LMP"). These batteries have an anode made of lithium and an organic electrolyte with no water. Though LMP batteries have been used here, other lithium-batteries might be used as well and still fall within the scope of the present invention. Lithium ion batteries are comprised of a carbon anode, a metal oxide cathode, and an electrolyte which is a lithium salt in an organic solvent. Other kinds of batteries, e.g., nickel-cadmium might work as well and would also fall within the scope of some embodiments of the present invention.

LMP batteries provide several key advantages over other battery architectures such as valve-regulated lead-acid (VRLA), gelled cell, and other known battery sources, in that they operate in high or low ambient temperatures (−40° F. to +149° F.) without the need for external heating or cooling requirements. A battery capable of withstanding extreme temperatures is advantageous for a communications provider in industrial applications. One reason for this is that in most wireless telecommunication networks, a base transceiver station (BTS) is located at or near an outdoor communications tower. Because of this, it is important that the unit be able to endure a wide range of weather and temperature changes. LMP batteries may be used by a provider in an enclosure having no air-conditioning. This results in saved space and costs.

Another advantage of using LMP batteries within a communications network is that they are environmentally friendly and noncorrosive. This allows a provider to house the batteries within a building structure, enclosure, or cabinet having expensive communication equipment without the requirements of external venting. LMP batteries do not emit gases (hydrogen and other toxic gases) that are harmful to breathe and therefore do not require ventilation. Moreover, LMP batteries are less likely to corrode important communication equipment.

LMP batteries exhibit a high life span (greater than 10 years) and a slow-linear aging characteristic. This provides a communication provider with greater reliability and predictable battery replacement. Additionally, LMP batteries may be disconnected and put into sleep mode. Sleep mode is a state in which the LMP is temporarily taken off line until it is later called back into duty. This avoids drain which would otherwise require periodic recharging.

Another distinct advantage of the LMP battery is the ability to locally or remotely monitor the battery status either from an LED source located on the battery, or via a link-cable connected to the provider's computer, communications network, or alarm system. Determining when a battery is nonfunctional is a time-saving tool for providers and technicians performing preventive maintenance measures. A visible LED source located on the battery provides an easily viewed indication of the batteries state of health. Furthermore, in the preferred embodiment, these batteries are smart devices, which enables them to notify a systems administrator over a computer network of failures.

A typical LMP battery used within an embodiment of the invention is a 48-volt, 63 amp-hour battery manufactured by "Avestor Model No. SE 48S63", but the scope of the invention is not limited to any particular manufacturer or amp-hour/voltage level used.

With respect to bridging, the LMP battery array 52 provides electrical power during the time it takes for the control mechanism to switch from one power source to another. Thus, LMP batteries 52 are easily capable of handling the down time which occurs when a switch is made between power sources (e.g., going from natural gas to electric utility or from utility to hydrogen).

The LMP battery array 52 is also used as a backup power source. Thus they must be selected to have sufficient discharge rates to meet backup requirements.

Each LMP battery 52 is electrically linked to bus 34 in parallel with fuel cell DC output 48 and the rectifier outputs 32. As seen in the figure, all of these DC sources are connected into bus 34. Bus 34 then makes the electrical connection into the power distribution equipment in BTS 36.

Though not shown, the power system of the present invention also comprises a control system which includes a number of sensing and control mechanisms (not shown) for determining which fuel source to activate and which power source to engage. As will be known to one skilled in the art, these kinds of automated systems may be separate devices, or may be integral to the valves, bus lines, and/or devices being monitored. Likewise, the control mechanisms may be separate devices, such as programmable logic controllers, or may be integrated into the components already described.

Regardless, this kind of monitoring and activating equipment will be known to one skilled in the art, and one skilled in the art will know how to arrange these devices such that (i) natural gas can be selectively delivered from one of sources 12 and 16; (ii) turbine 10 can be activated and deactivated automatically; (iii) automated valves 50 can be opened and closed to supply fuel cell 40; (iv) switch 22 changed between positions 24 and 26 in response to the availability of natural gas to turbine 10; and other automated requirements which will be evident and fall within the abilities of one skilled in the art.

The power-management flow chart of FIG. 2 shows different contingency plans in the event that the primary power source (powering turbine 10 using natural gas from a utility), and possibly secondary power sources, are inoperable for one reason or another.

As a preliminary measure, in a step 200, an LMP battery array is provided for use in the system. These batteries normally come from the manufacturer with sufficient charge, but may be recharged if necessary. They are disposed in the system as shown in FIG. 1, and will serve dual purposes in the system—bridging and backup. Both of these roles serve to ensure that power is maintained to the BTS 36.

It is very important that power is not lost to the BTS—even temporarily. Failures could irrevocably damage customer relations. Customers are increasingly becoming dependent on telecommunications systems to handle important, e.g., financial, transactions. The system and process here act to dramatically reduce the prospect of failure. And the importation of the LMPs into the system in step 200 furthers this goal.

After the system is in place, the rest of the steps describe a hierarchy of system operation. In a first step 202, it is determined whether natural gas is available from utility 12. The existence of utility natural gas is continuously monitored by sensors or other means known to those skilled in the art. One example which could be used here is that of a pressure sensor located down stream of the expansion tank (not shown) in line 14. The presence of utility-provided natural gas would be indicated by meeting a threshold pressure. An absence of utility natural gas would show up as a drop in pressure below this threshold. If the existence of utility-provided natural gas is indicated, turbine 10 will be used to generate electricity from commercially available source 12 in a step 204. Switch 22 will be in its first position 24 as shown. This position causes the AC generated to be converted to DC by one or more rectifiers (e.g., plurality of rectifiers 32) in a step 206. The DC output from the rectifiers is received by bus 34 which supplies the necessary DC power to BTS 36.

Referring to step 208, LMP batteries (e.g., LMPs 52) will be used to bridge any temporary power deficiencies caused in delivering fuel to and then firing up the turbine 10. This step 208 bridging function is repeated for any time in which power is temporarily lost because of switching between energy generation devices (e.g., turbine 10 and fuel cell 40) or start-up delays. As will be discussed in more detail later, the LMPs also provide an additional source of backup power where all of the energy generation devices are down. But step 208 is intended to reflect the type of situation in which there is a temporary loss of power and bridging is necessary.

If, in step 202, sensing equipment indicates that natural gas is not available from utility 12, the process moves on to a query of whether a stored source of natural gas (e.g., in natural gas tanks 16) is available in a step 214. If this is so, valves 17 will be activated to release pressurized natural gas from the tanks to maintain the fueling of turbine 10 and maintain the generation of AC by turbine 10 in step 204. While the natural gas source is switched, transfer switch 22 remains in first position 24 enabling the AC output 18 of turbine 10 to continue to travel through bus 30 to the rectifiers 32. Rectifiers 32 then convert the AC into DC in step 206 and then in step 210 provide DC power to BTS 36 via bus 34.

The other possibility in step 214 is that either immediately or some time after valves 17 have been opened and the stored source of natural gas has run out, pressures in line 14 drop below the threshold indicating the complete absence natural gas as an energy source. The pressure sensing devices in line 14 will indicate to the control system that the pressures have fallen below the threshold and that natural gas is unavailable.

If natural gas is unavailable from either of sources 12 or 16, then the control system will cause switch 22 to go to its second position 26. Second position 26 allows the system to access AC power from commercial utility 28. This AC power is then, via bus 30, converted into DC by rectifiers 32 and made available to the BTS 36 through bus 34.

There will be a short delay from the time turbine 10 ceases to function, switch 22 is activated by the control system to change positions (from 24 to 26), and AC is restored to rectifiers 32 by utility 28. In such a case, temporary power failure will be avoided by returning to LMP bridging step 208. In this step the LMPs will temporary maintain power to fill the short amount of time required to make the switch to access the commercial AC power grid 28 and beyond, if necessary.

Next, in a step 216, a determination is made as to whether AC power is, or is not available from local utility 28. This determination will be made by electronically monitoring bus 30 after the switch is made for power. If no AC is available from utility 28 because, e.g., (i) the power grid is down, or (ii) switch 22 malfunctions and cannot make the switch, no current will be detected in bus 30 and the control system will cause the process to move on to a step 218.

In step 218, a query is made as to whether pressurized hydrogen is available from tanks 46. This is automatically determined by the control system using pressure sensors in a manner known to those skilled in the art.

If hydrogen is available, the process moves on to a step 220. In step 220, valves 50 will be automatically opened up and hydrogen will travel through hydrogen tubing 44 to fuel cell 40. Once in fuel cell 40, PEMs 42 generate a DC power output. This output is introduced into bus 34 to supply BTS 36.

There will be some delay in reaching step 220 from step 202. Referencing FIG. 1, this is from the time turbine 10 fails due to lack of natural gas, then it is determined that AC power is not available from utility 202, and the fuel cell is brought on line. Most of this down time is due to the delay in the hydrogen getting to the point at which it is adequately supplying fuel cell 40. Until sufficient DC power is being generated by the fuel cell, power to BTS 36 will be maintained by returning us again to step 208 in which the LMP battery array 52 operates to temporarily bridge between switches in energy sources.

Fuel cell 40 will continue to generate DC output in step 220 until (i) the hydrogen runs out, or (ii) one of the other sources (natural gas or utility AC) are restored. If any of natural gas sources 12 or 16, or utility AC 28 are restored, the control system will switch back to these sources.

But if these sources are not restored, and the hydrogen runs out, the process will move on to a step 221. In step 221, a determination will be made as to whether the LMP array has power. If so, the LMPs in a step 222 will be relied on in a backup capacity. They will be used to power the facility until they run out of charge. If the voltage of these LMPs drops below a minimum threshold below which the DC power being delivered to BTS 36 is insufficient, the process will loop back to step 202 as shown in FIG. 2. This will repeat the inquiries as to whether any of the alternative sources (natural gas, utility AC, hydrogen) have been restored. If so, the process will revert back to that source. If not, the loop of inquiries will continue until one of the sources (natural gas, utility AC, hydrogen, or the LMPs) is restored.

It will be appreciated by persons skilled in the art that the present invention is not limited to what has been particularly shown and described above. Rather, all matter shown in the accompanying drawings or described above is to be interpreted as illustrative and not limiting. Accordingly, the scope of the present invention is defined by the appended claims rather than the foregoing description.

What is claimed is:

1. A DC power-supply system comprising:
a lithium comprised energy-storage device;
a fuel-cell utilizing hydrogen to generate electrical power;
a turbine generator producing AC power;
a utility supplying AC power, wherein
said AC power is selected and converted to DC power by a converter.

2. The system of claim 1 wherein said first gas is natural gas.

3. The system of claim 2 wherein said turbine is adapted to receive a utility-provided source of natural gas.

4. The system of claim 2 wherein said turbine is adapted to receive a stored source of natural gas which is stored in tanks on site.

5. The system of claim 3 including a control system which is operable to switch between said utility provided and said stored sources of natural gas depending on availability.

6. The system of claim 5 wherein said fuel cell comprises at least one proton exchange membrane (PEM).

7. The system of claim 5 wherein said lithium-comprised energy storage device, an output of said conversion device, and an output of said fuel cell are all electrically connected.

8. A method of supplying DC power utilizing the apparatus of claim 1.

9. The system of claim 5 further including a control system which is operable to switch between said turbine generater and said imported sources of AC based on power availability.

10. The system of claim 1 wherein said conversion device is a rectifier.

11. The system of claim 1 wherein said lithium-comprised energy storage device is a lithium cell.

12. The system of claim 11 wherein said lithium cell is a lithium-metal-polymer battery.

13. The system of claim 11 wherein said lithium cell is a lithium-ion battery.

14. A method of supplying power comprising:
providing a commercial utility AC power;
combusting gas in turbine generator for production of AC power;
providing for the utilization of a lithium-comprised energy-storage device to provide a source of power in addition to said AC power;
providing for the utilization of a fuel-cell that utilizes hydrogen to generate electrical power; and
selecting and converting said turbine generator or said utility AC power to DC power by a converter.

15. A method of supplying a DC power comprising:
providing a turbine generator utilizing a combustion gas for production of AC power;
providing a commercial utility AC power,
providing a lithium-comprised energy-storage device to provide an additional source of power;
providing a fuel-cell utilizing hydrogen to generate electrical power; and
selecting and converting said turbine generator or said utility AC power to DC power by a converter.

16. The method of claim 15 comprising:
providing a lithium-metal-polymer battery to serve as said lithium-comprised energy storage device.

17. The method of claim 15 comprising:
providing a lithium-ion battery to serve as said lithium-comprised energy storage device.

* * * * *